United States Patent [19]

Reddy et al.

[11] Patent Number: 5,582,768
[45] Date of Patent: *Dec. 10, 1996

[54] PHOSPHOR AND METHOD OF MAKING SAME

[75] Inventors: Vaddi B. Reddy, Sayre; Ronald E. Karam, Towanda; Shellie K. Northrop, Sayre, all of Pa.

[73] Assignee: Osram Sylvania, Inc., Danvers, Mass.

[*] Notice: The portion of the term of this patent subsequent to Feb. 1, 2013, has been disclaimed.

[21] Appl. No.: 547,183

[22] Filed: Oct. 24, 1995

Related U.S. Application Data

[60] Continuation of Ser. No. 162,857, Dec. 6, 1993, Pat. No. 5,489,398, which is a division of Ser. No. 12,095, Feb. 1, 1993, Pat. No. 5,306,441, which is a continuation-in-part of Ser. No. 999,637, Dec. 31, 1992, abandoned.

[51] Int. Cl.$^6$ .................. C09K 11/70; C01B 23/45
[52] U.S. Cl. .................. 252/301.4 P; 252/301.4 F; 252/301.4 H; 423/304; 423/308; 423/306
[58] Field of Search .................. 252/301.4 F, 301.4 H, 252/301.4 P; 423/304, 308, 306

[56] References Cited

U.S. PATENT DOCUMENTS

| | | | |
|---|---|---|---|
| 2,704,261 | 3/1955 | Comeforo | 106/39 |
| 2,987,777 | 6/1961 | Beaver et al. | 18/59.2 |
| 3,149,947 | 9/1964 | Eppler et al. | 65/33 |
| 3,149,982 | 9/1964 | Eppler | 106/39 |
| 3,416,884 | 12/1968 | Stynes et al. | 23/105 |
| 3,513,105 | 5/1970 | Ward | 252/301.6 |
| 5,032,547 | 7/1991 | Giannelis | 501/3 |
| 5,085,845 | 2/1992 | Ueda et al. | 423/308 |
| 5,306,441 | 4/1994 | Reddy et al. | 252/301.4 H |
| 5,489,398 | 2/1996 | Reddy et al. | 252/301.4 F |

FOREIGN PATENT DOCUMENTS 7611010 4/1976 France.

OTHER PUBLICATIONS

Alberti et al., Crystalline insoluble salts of polybasic metals –II. Synthesis of crystalline zirconium or titanium phosphate by direct precipitation, J. Inorg. Nucl. Chem., vol. 30, 317–18 (1968) no month.

Eitel et al., Synthetic Mica Investigations: II, Role of Fluorides in Mica Batch Reactions, J. Amer. Cer. Soc., vol. 36, pp. 341–348 (1953) no month.

Luca et al., Characterization of Copper (II) –Substituted Synthetic Fluorohectorite Clay and Interaction with Adsorbates by Electron Spin Resonance, Electron Spin Echo Modulation, and Infrared Spectroscopies, Chem. Mater., 3, 1073–1081 (1991) no month.

Shell et al., Fluoromicas, Bureau of Mines, U.S. Dept. of Interior, Bulletin 647, pp. 123–144 (1969) no month.

Bergaya et al., Luminescence of Eu3+ and Tb3+ Ions Adsorbed on Hydrated Layer–lattice Silicate Surfaces, J. Chem. Soc., Faraday Trans. 2, 79, 505–518 (1983) no month.

*Primary Examiner*—Melissa Bonner
*Attorney, Agent, or Firm*—Robert F. Clark

[57] ABSTRACT

Electroluminescent phosphors having substantially increased luminance and maintenance over that of prior art electroluminescent phosphors may be made by (1) doping an inorganic intercalation compound having an atomic structure interspersed with vacant spaces, with selected activator ions capable of luminescent emission, and (2) introducing organic monomers or other conductive material into the vacant spaces of the atomic structure of the doped inorganic intercalation compound. The organic monomers may be polymerized in situ to form conductive polymers therein.

11 Claims, 3 Drawing Sheets

PHOSPHOR AND METHOD OF MAKING SAME

The United States Government has rights in this invention pursuant to U.S. Government Contract No. DAAL01-92-C-0241.

CROSS-REFERENCE TO RELATED APPLICATIONS

This application is a continuation of application Ser. No. 08/162,857, filed Dec. 6, 1993, now U.S. Pat. No. 5,489,398, which is a division of application Ser. No. 08/012,095, filed Feb. 1, 1993, now U.S. Pat. No. 5,306,441, which is a continuation-in-part of application Ser. No. 07/999,637, filed Dec. 31, 1992, now abandoned.

TECHNICAL FIELD

This invention relates to phosphors and methods of making them. In particular, it relates to methods of making electroluminescent phosphors by providing an inorganic intercalation compound characterized by an atomic structure interspersed with vacant spaces of sufficient size to accommodate foreign atoms or molecules within them; doping the inorganic intercalation compound with selected activator ions which, when excited by an electric field or other exciting radiation, are capable of luminescent emission; and interposing selected conductive materials into the vacant spaces of the inorganic intercalation compound. It also relates to electroluminescent phosphors and electroluminescent lamps made by this method.

BACKGROUND ART

Electroluminescent lamps typically provide approximately 30 foot-lamberts of illumination and are thus suitable for various low-intensity illumination applications, such as decorative lighting, egress lighting, cockpit and dashboard display panels, and membrane switches. They have also been used as backlighting sources for liquid crystal display (LCD) devices. However, most LCD applications, including black/white and color LCD displays and high definition displays, require greater backlighting illumination than electroluminescent lamps can provide. Furthermore, most electroluminescent lamps have poor maintenance characteristics: they typically degrade to about half their initial brightness within 2000 hours of operation.

Fluorescent lamps, which provide between 2000 and 4000 foot-lamberts of illumination, have been used as illumination sources for these LCD display devices. However, when used in LCD display applications, fluorescent lamps have their own disadvantages. For example, they are bulky. Being made of glass, they are also fragile and thus are unable to withstand rugged environments; if broken, they may release small amounts of mercury. They also do not operate at temperatures below $-20°$ C. In contrast, electroluminescent lamps do not have the disadvantages of size and construction that fluorescent lamps have. They are quite small and thin, light in weight, extremely rugged, and they can operate at temperatures well below $-20°$ C.

To be useful in LCD backlighting applications, electroluminescent phosphors must emit in narrow bands of the blue, green and red zones of the visible spectrum. Specifically, the blue emission wavelength should preferably be between 460–470 nm, the green emission wavelength should preferably be between 535–545 nm, and the red emission wavelength should preferably be between 610–650 nm.

One electroluminescent phosphor which meets the above-described blue emission color requirements for LCD backlighting applications is a blue-emitting copper-activated zinc sulfide phosphor, ZnS:Cu. Zinc sulfide phosphors and methods of making them are described in U.S. Pat. Nos. 2,807,587 to Butler et al., 3,031,415 to Morrison et al., 3,031,416 to Morrison et al., 3,152,995 to Strock, 3,154,712 to Payne, 3,222,214 to Lagos et al., 3,657,142 to Poss, and 4,859,361 to Reilly et al., all of which are assigned to the assignee of the instant invention. However, notwithstanding their emission color characteristics, none of these electroluminescent zinc sulfide phosphors, nor any other electroluminescent phosphors, are sufficiently bright for use in most LCD backlighting applications or high definition display devices.

It would be an advantage in the art to provide an electroluminescent phosphor having improved luminance and maintenance for use in LCD and high definition display devices, and a method of making the phosphor.

SUMMARY OF THE INVENTION

It is an object of this invention to obviate the disadvantages of the prior art.

It is another object of this invention to provide an electroluminescent phosphor having substantially increased luminance and maintenance over prior art electroluminescent phosphors.

It is another object of this invention to provide a method of making an electroluminescent phosphor having substantially increased luminance and maintenance over prior art electroluminescent phosphors.

These objects are accomplished, in one aspect of the invention, by an electroluminescent phosphor which comprises an inorganic intercalation compound characterized by an atomic structure interspersed with vacant spaces of sufficient size to accommodate foreign atoms or molecules within them, wherein the inorganic intercalation compound has been (1) doped with selected activator ions which are capable of luminescent emission when excited by an electric field or other exciting radiation, and (2) interposed with conductive organic polymers or other conductive material within the vacant spaces of the doped inorganic intercalation compound.

These objects are accomplished, in another aspect of the invention, by a method of making an electroluminescent phosphor, comprising the steps of: providing an inorganic intercalation compound characterized by an atomic structure interspersed with vacant spaces of sufficient size to accommodate foreign atoms or molecules within them; doping the inorganic intercalation compound with selected activator ions which are capable of luminescent emission when excited by an electric field or other exciting radiation to obtain a doped inorganic intercalation compound; and interposing selected conductive materials into the vacant spaces of the doped inorganic intercalation compound.

BEST MODE FOR CARRYING OUT THE INVENTION

Figure 1:
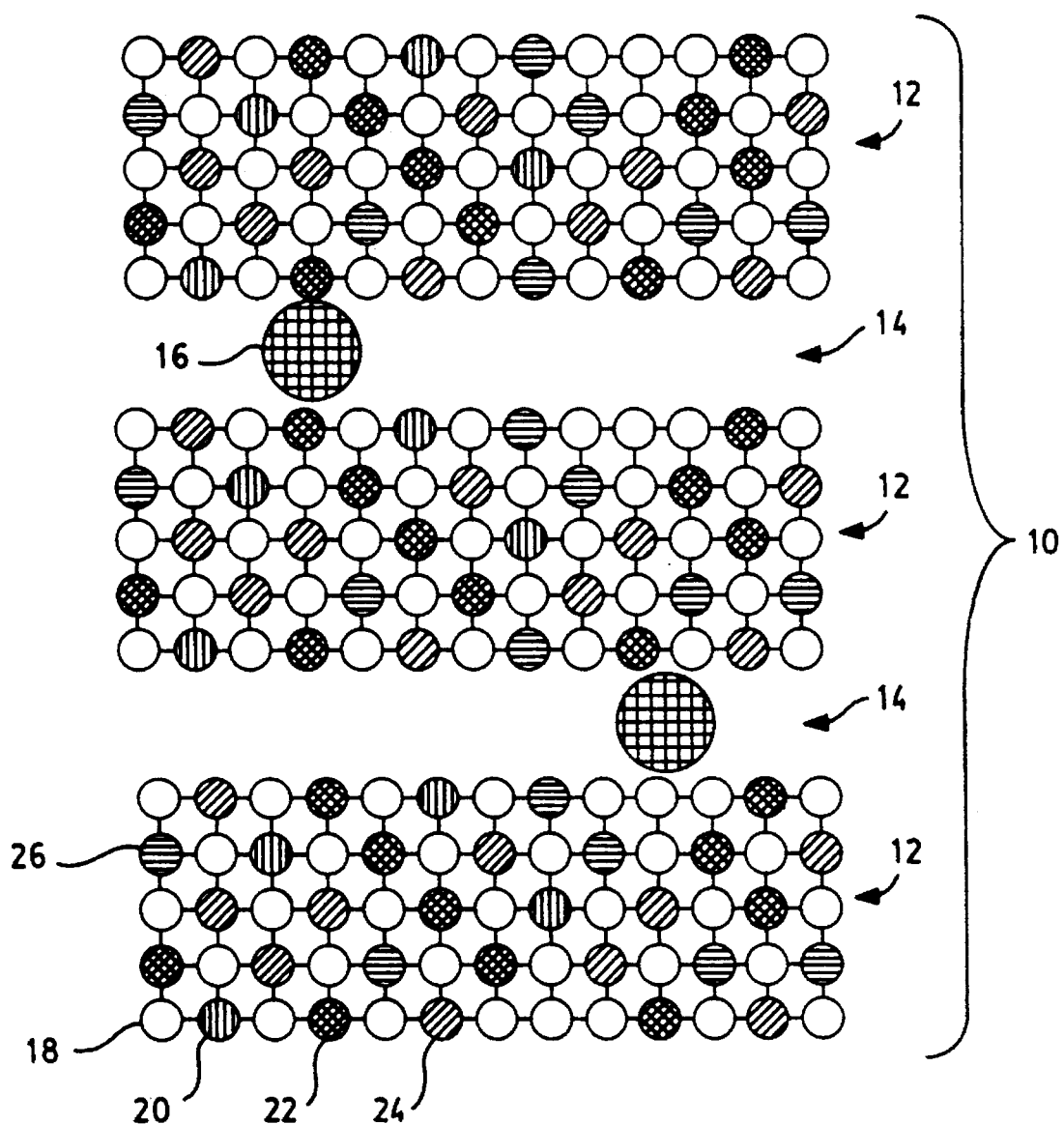
FIG. 1 is a schematic diagram representing the approximate atomic structure of fluorophlogopite, an inorganic intercalation compound.

For a better understanding of the present invention, together with other and further objects, advantages and capabilities thereof, reference is made to the following specification and appended claims.

Electroluminescent phosphors having substantially increased luminance over that of prior art electroluminescent phosphors may be made by doping an inorganic intercalation compound, characterized by an atomic structure interspersed with vacant spaces of a sufficient size to accommodate foreign atoms or molecules within them, with selected activator ions which are capable of luminescent emission when excited by an electric field or other exciting radiation. Conductive materials, such as, for example, mercury, or selected organic monomers which become conductive when polymerized, may then be interposed into the vacant spaces of the atomic structure of the doped inorganic intercalation compound. The organic monomers may then be polymerized in situ to form conductive polymers therein which may effect an expansion of the conductive volume of the doped inorganic intercalation compound. The result is an electroluminescent phosphor which may have substantially greater luminance than that of prior art electroluminescent phosphors.

Inorganic intercalation compounds are known. They generally have an atomic structure characterized by the presence of ionically bonded atoms in substructures interspersed with vacant spaces which are sufficiently large to accommodate foreign atoms or molecules within them. Intercalation compounds are generally of three types: lamellar, or layered, compounds; channel-type compounds; and cage-type compounds.

In lamellar intercalation compounds the atomic substructures comprise layers, or lamellae, of ionically bonded inorganic atoms. The lamellae themselves are bonded together by relatively weak forces, known as Van der Waals forces. The relatively weak Van der Waals forces between the lamellae permit the entry of foreign atoms or molecules into the spaces (hereinafter referred to as "Van der Waals spaces") between the lamellae. The Van der Waals spaces in lamellar intercalation compounds are large enough to accommodate foreign atoms or molecules which may be introduced by various methods, such as, for example, ion exchange, diffusion, acid-base reactions and electrochemical reactions.

In channel-type intercalation compounds the atomic substructures comprise zones of ionically bonded inorganic atoms which are interspersed with networks of vacant channels which are sufficiently large to accommodate foreign atoms or molecules within them. In cage-type intercalation compounds the atomic substructures of ionically bonded atoms are interspersed with vacant holes, or cages, which are sufficiently large to accommodate foreign atoms or molecules within them. The vacant channels or cages are interspersed throughout the atomic structure of the intercalation compound.

The lamellae of a crystal of a lamellar inorganic intercalation compound are generally parallel to the long axis of the crystal, whereas the channels of a channel-type inorganic intercalation compound crystal, and the cages or holes of a cage-type crystal, may be more randomly oriented.

Suitable inorganic intercalation compounds include vermiculites, micas, fluoromicas, xerogels (such as, for example, vanadium pentoxide made by sol-gel processing), iron oxychloride, zirconium phosphates, and zeolites.

Vermiculite is a lamellar intercalation compound which has the idealized general formula $(Ca,Mg)_{x/2}(Mg,Fe,Al)_3[(Al,Si)_4O_{10}](OH)_2$, where the first listed calcium and magnesium ions are exchangeable cations which reside in the interlamellar Van der Waals spaces, and x is any integer. Mica is another type of lamellar intercalation compound having the general idealized formula $M_x(Si_4O_{10})(OH)_2$, where M is an exchangeable cation, typically aluminum or magnesium, and x is any integer. Fluoromicas, which are similar in structure to vermiculites, have the general idealized formula $(Ca,Mg)_{x/2}(Mg,Fe,Al)_3[(Al,Si)_4O_{10}]F_2$. An example of a fluoromica is fluorophlogopite, which has the general formula $KMg_3(Si_3Al)O_{10}F_2$.

FIG. 1 is a schematic representation of the lamellar atomic structure of fluorophlogopite. Fluorophlogopite 10 is comprised of atoms of oxygen 18, aluminum 20, silicon 22, magnesium 24 and fluorine 26 which are ionically bonded together into atomic substructures 12. Between the atomic substructures 12 are Van der Waals spaces 14 in which reside potassium atoms 16.

Zirconium phosphates have the general formula $Zr(MPO_4)_2 \cdot xH_2O$, where M is a monovalent exchangeable cation and x is any integer.

Zeolites are crystalline aluminosllicate intercalation compounds having an atomic structure which is interspersed with networks of channels and/or cages filled with exchangeable cations and water. Zeolites have the general formula $M_xD_y(Al_{x+2y}Si_{n-(x+2y)}O_2n) \cdot mH_2O$, where M is a monovalent or divalent exchangeable cation and x and y are any integers. The channels and/or cages within the zeolite structure are sufficiently large to accommodate foreign atoms or molecules within them, including organic polymers, which may be introduced by the previously described methods.

The inorganic intercalation compounds are first doped with selected activator ions which are capable of luminescent emission under cathodoluminescent, fluorescent, x-ray or electroluminescent excitation. The following table lists several activator ions suitable for doping, along with the probable emission color from each. The precise emission colors obtained will depend on the site occupied by the particular activator ion in the lattice of the inorganic intercalation compound.

TABLE 1

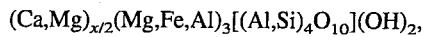

| RED | GREEN | BLUE |
|---|---|---|
| $Mn^{+2}$ | $Mn^{+2}$ | $Sb^{+3}$ |
| $Mn^{+4}$ | $Eu^{+2}$ | $Ti^{+4}$ |
| $Fe^{+3}$ | $Tb^{+3}$ | $Sn^{+2}$ |
| $Eu^{+3}$ | | $Tm^{+3}$ |
| $Sm^{+3}$ | | $Eu^{+2}$ |
| $Cr^{+3}$ | | $Ce^{+3}$ |

The activator ions may be doped into the atomic lattice of the inorganic intercalation compound by several methods, including high-temperature solid-state synthesis (generally in excess of 1000° C.), hydrothermal synthesis, wet-chemical procedures and low-temperature procedures. The activator ions generally occupy lattice sites within the atomic structure of the inorganic intercalation compound. For example, when an inorganic intercalation compound, such as fluorophlogopite, is doped with manganese ions, the manganese ions replace a small fraction of the magnesium ions in the fluorophlogopite atomic structure.

Fluxing agents, such as, for example, sodium chloride or barium chloride, may be used during the doping process, although they are not generally required.

The doped inorganic intercalation compound may be excited with, for example, cathode ray or ultraviolet radiation (since most electroluminescent materials are also cathodoluminescent and/or photoluminescent), to determine its luminescence intensity and its emission color. Luminescence intensity of the doped inorganic intercalation compound may be optimized by varying the amounts of the desired dopant ions.

Conductive materials, such as mercury, or selected organic monomers which are capable of becoming conductive when polymerized, such as aniline and pyrrole, may then be introduced into the vacant spaces of the atomic structure of the doped inorganic intercalation compound. If organic monomers are used, they may then be polymerized in situ to form conductive organic polymers. The conductive polymers may be formed in several ways, including the single polymerization of each organic monomer, the successive, multiple polymerizations of each organic monomer, and the addition of functional groups to an organic monomer to effect cross-linking of the monomer chains. The last two methods, successive polymerization and the addition of functional groups to the monomer, may effect a swelling of the polymer-filled spaces in the inorganic intercalation compound.

Figure 2:
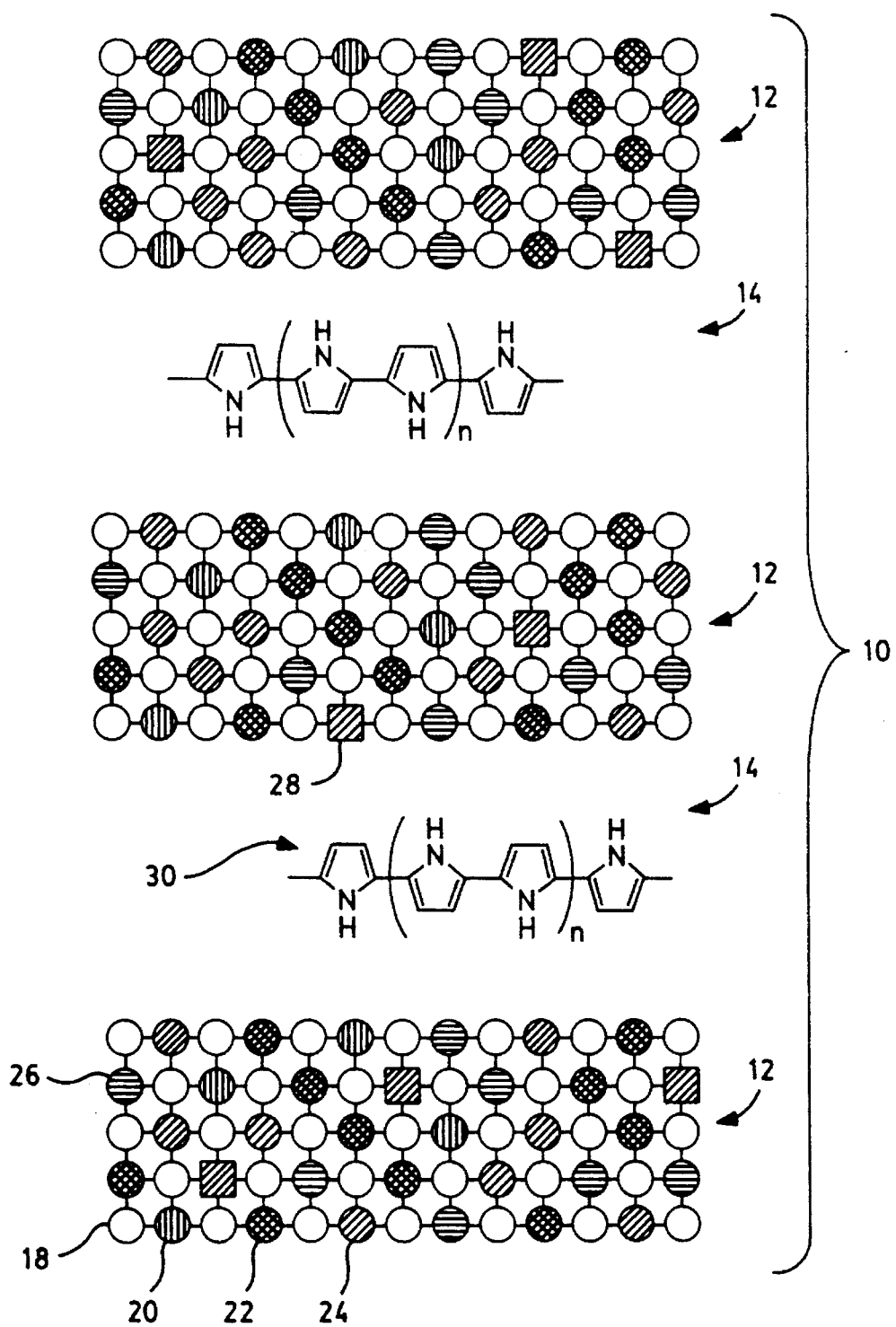
FIG. 2 is a schematic diagram representing the approximate atomic structure of fluorophlogopite which has been doped with manganese activator ions and interposed with polypyrrole polymers, the monomers of which were previously introduced into the interlamellar Van der Waals spaces of the fluorophlogopite.

FIG. 2 is a schematic representation of fluorophlogopite 10 which has been doped with manganese ions 28 and interposed with pyrrole monomers 30 into the Van der Waals spaces 14.

The following equations are illustrative of the chemical reactions that occur during synthesis of an electroluminescent phosphor according to the method of this invention. In this illustrative example, the inorganic intercalation compound is a vermiculite and the conductive polymer is polyaniline.

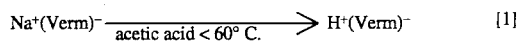   [1]

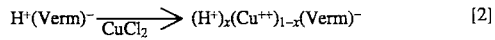   [2]

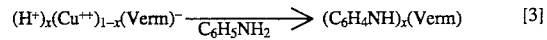   [3]

In Equation [1], a vermiculite having sodium as the exchangeable monovalent cation occupying the Van der Waals spaces is contacted with acetic acid at a temperature of less than 60° C. Monovalent hydrogen ions, $H^+$ (or hydronium ions $H_3O^+$), replace the sodium ions in the Van der Waals spaces of the vermiculite.

In Equation [2], the vermiculite containing hydrogen or hydronium as the exchangeable monovalent cation is contacted with a copper chloride solution. In the presence of copper chloride, some of the monovalent ions in the vermiculite are replaced with divalent copper ions.

In Equation [3], the vermiculite containing both monovalent hydrogen (or hydronium) ions and divalent copper ions is reacted with aniline. The aniline enters the Van der Waals spaces of the vermiculite in an acid-base reaction with the monovalent cation. In the presence of the divalent copper ions the aniline will polymerize to form conductive polyaniline in the Van der Waals spaces of the vermiculite.

The result of polymerization of selected organic monomers will be the interposition of conductive polymers into the vacant spaces of the intercalation compound. Under certain polymerization conditions, an expansion of the conductive volume of the intercalation compound may also occur. When lamellar intercalation compounds, such as vermiculites, are used, polymerization of the organic monomer will occur in the interlamellar Van der Waals spaces of the intercalation compound. When channel-type or cage-type intercalation compounds, such as zeolites, are used, polymerization of the organic monomer will occur within the vacant channels or cages interspersed throughout the atomic structure of the intercalation compound.

When particles of an electroluminescent phosphor made by the method of this invention are exposed to an electric field, the electric field will concentrate across the insulating portions of the particles which contain the activator ions capable of luminescent emission, since the conductive portions will not support an electric field. The activator ions will luminesce very efficiently when exposed to a highly concentrated electric field.

To increase the conductive volume of the doped inorganic intercalation compound and thereby increase luminance, particularly in lamellar intercalation compounds characterized by the presence of Van der Waals spaces, polymerization of the organic monomer in three dimensions may be desirable. For example, to effect polymerization of aniline in three dimensions, some of the hydrogen atoms on the phenyl group ($C_6H_5$) may be replaced with a carboxylic acid group (COOH). Alternatively, some of the hydrogen atoms of the phenyl group of the aniline molecule may be replaced with both carboxylic acid and amine groups ($NH_2$) to crosslink the conductive polymer chains through the formation of peptide linkages. The conductivity of the polymer should not be adversely affected by the substitution of these alternative functional groups in the polymer backbone. Alternatively, swelling of the conductive volume of the doped inorganic intercalation compound may be achieved by successive monomer-to-polymer conversions within the vacant spaces of the intercalation compound.

Figure 3:
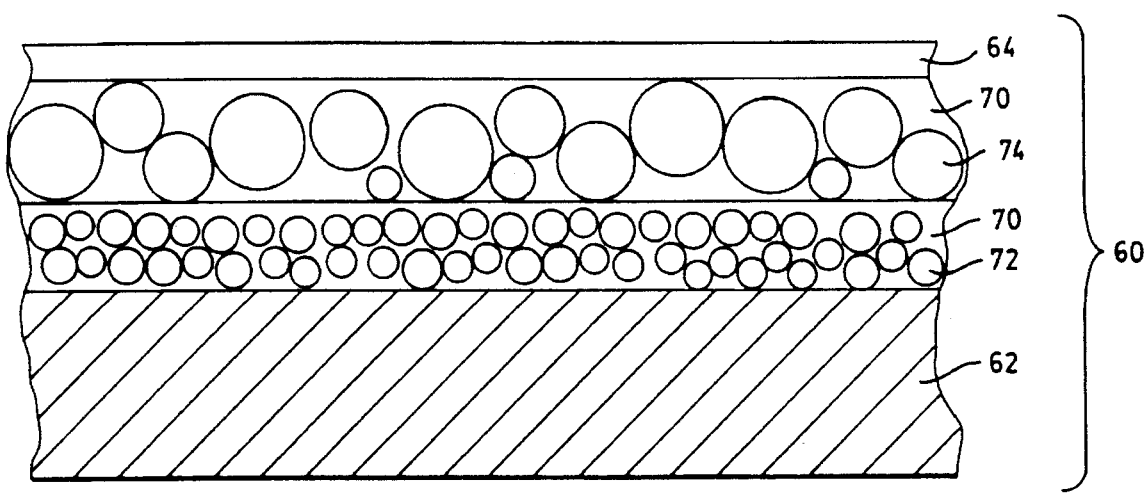
FIG. 3 is a schematic representation of the structure of an electroluminescent lamp.

FIG. 3 is a schematic representation of the structure of an electroluminescent lamp 60. A conductive substrate material, such as aluminum or graphite, forms a first electrode 62 of the lamp 60, while a transparent conductive film, such as indium tin oxide, forms a second electrode 64. Sandwiched between the two conductive electrodes 62 and 64 are two additional layers of dielectric material 70 which can be, for example, cyanoethyl cellulose or cyanoethyl starch. Adjacent to the first electrode 62 is a layer of dielectric material 70 in which may be embedded particles of a ferroelectric material 72. Adjacent to the second electrode 64 is a layer of dielectric material 70 in which may be embedded particles of the electroluminescent phosphor 74 of this invention.

The luminance of an electroluminescent phosphor made by the method of this invention may be equivalent to that obtained from commercially available fluorescent lamps.

The following non-limiting examples are presented.

EXAMPLES 1–6

Green-emitting titanium-activated fluorophlogopite phosphor samples having the general formula $KMg_3(Si_3Al)O_{10}F_2$:Ti were prepared by blending the following raw materials: 9.40 grams of potassium carbonate, $K_2CO_3$; 20.39 grams of aluminum oxide, $Al_2O_3$; 48.37 grams of magnesium oxide, MgO; 64.04 grams of silicon dioxide, $SiO_2$; 29.51 grams of potassium hexafluorosilicate, $K_2SiF_6$; and varying amounts (0 mole; 0.320 gram, or 0.01 mole; 0.959 gram, or 0.03 mole; 1.278 grams, or 0.04 mole; 1.598 grams, or 0.05 mole; and 3.995 grams, or 0.125 mole) of titanium dioxide, $TiO_2$. All raw materials were at least certified grade purity and are commercially available. These raw materials were blended in a mechanical mixer for 20–30 minutes until uniformly mixed. The mixture was charged to an alumina crucible and fired in air at 1200° C. for 12 hours. The fired cakes were then cooled, pulverized, screened and, if necessary, washed in deionized water. Scanning Electron Microscopy (SEM) techniques revealed that the resulting phosphor particles had a platelet morphology. X-ray diffraction data indicated the formation of single-phase fluorophlogopite. The phosphor samples were evaluated for luminescence under cathode ray excitation and produced a green emission with a maximum peak at about 540 nm. A weak red emission with a peak at about 720 nm was also observed. Optimum luminescence was obtained at 0.03 mole titanium per mole of fluorophlogopite.

EXAMPLES 7–15

Red-emitting manganese-activated fluorophlogopite phosphor samples having the general formula $KMg_3(Si_3Al)O_{10}F_2$:Mn were prepared by blending the following raw materials: 9.40 grams of potassium carbonate, 20.39 grams of aluminum oxide, 48.37 grams of magnesium oxide, 64.04 grams of silicon dioxide, 29.51 grams of potassium hexafluorosllicate, and varying amounts (0 mole; 0.920 gram, or 0.02 mole; 1.379 grams, or 0.03 mole; 1.839 grams, or 0.04 mole; 2.299 grams, or 0.05 mole; 2.759 grams, or 0.06 mole; 3.219 grams, or 0.07 mole; 3.678 gram, or 0.08 mole; and 4.598 grams, or 0.10 mole) of commercially available manganese carbonate, $MnCO_3$. These raw materials were blended in a mechanical mixer for 20–30 minutes until uniformly mixed. The mixture was charged to an alumina crucible, which was placed into a larger alumina crucible containing graphite pellets (to produce a mildly reducing atmosphere) and covered, and fired at 1200° C. for 12 hours. The fired cakes were then cooled, pulverized, screened and, if necessary, washed in deionized water. Scanning electron microscopy techniques revealed that the resulting phosphor particles had a platelet morphology. X-ray diffraction data indicated the formation of single-phase fluorophlogopite. The phosphor samples were evaluated for luminescence under cathode ray excitation and produced a red emission with a maximum peak at about 700 nm. Optimum luminescence was obtained at 0.04 mole of manganese per mole of fluorophlogopite.

EXAMPLES 16–21

Green-emitting terbium-activated fluorophlogopite phosphor samples having the general formula $KMg_3(Si_3Al)O_{10}F_2$:Tb were prepared by blending the following raw materials: 4.7 grams of potassium carbonate, 10.2 grams of aluminum oxide, 24.19 grams of magnesium oxide, 32.02 grams of silicon dioxide, 14.75 grams of potassium hexafluorosilicate, and varying amounts (0 mole; 0.216 gram, or 0.005 mole; 0.432 gram, or 0.01 mole; 0.864 gram, or 0.02 mole; 1.730 grams, or 0.04 mole; and 2.16 grams, or 0.05 mole) of commercially available terbium fluoride, $TbF_3$. These raw materials were blended in a mechanical mixer for 20–30 minutes until uniformly mixed. The mixture was charged to an alumina crucible which was then placed into a larger alumina crucible containing graphite pellets (to produce a mildly reducing atmosphere) and covered, and fired at 1200° C. for 12 hours. The fired cakes were then cooled, pulverized, screened and, if necessary, washed in deionized water. Scanning electron microscopy techniques revealed that the resulting phosphor particles had a platelet morphology. X-ray diffraction data indicated the formation of single-phase fluorophlogopite. The phosphor samples were evaluated for luminescence under cathode ray excitation and produced a characteristic $Tb^{3+}$ green emission with a maximum peak at about 540 nm. Optimum luminescence was obtained at 0.01 mole of terbium per mole of fluorophlogopite.

EXAMPLES 22–26

Ultraviolet-to-blue-emitting titanium-activated crystalline alpha zirconium phosphate phosphor samples having the general formula $Zr_{1-x}Ti_x(HPO_4)_2.H_2O$ were prepared as follows:

| zirconium oxychloride octahydrate, $ZrOCl_2.8H_2O$ | titanium source |
| --- | --- |
| | 0 mole |
| 0.98 mole (47.21 grams) | 0.02 mole (1.238 grams) titanium sulfate hydrate |
| 0.96 mole (46.404 grams) | 0.04 mole (1.764 grams) ammonium titanyl oxalate hydrate |
| 0.95 mole (45.92 grams) | 0.05 mole (2.205 grams) ammonium titanyl oxalate hydrate |
| 0.92 mole (44.47 grams) | 0.08 mole (3.528 grams) ammonium titanyl oxalate hydrate |

The titanium source was either titanium sulfate hydrate, $Ti(SO_4)_2.xH_2O$, or ammonium titanyl oxalate hydrate, $(NH_4)_2TiO(C_2O_4)_2.H_2O$, both commercially available. Any titanium source which is soluble in either water or acid may be used. The zirconium oxychloride octahydrate, commercially available, was dissolved in 240 milliliters of deionized water. A second solution was prepared by dissolving the titanium source in 15 to 20 milliliters of deionized water. The two solutions were then combined in a polypropylene or Teflon beaker. To this solution was added, with stirring, 36 milliliters of 49% hydrofluoric acid, HF. Next, 207 milliliters of 85% phosphoric acid, $H_3PO_3$, was slowly added to the solution, with stirring, over a 10-minute period using a separating funnel. The amounts of both the hydrofluoric acid and phosphoric acid represented an excess of the stoichiometric amounts. Nitrogen gas, $N_2$, was then bubbled through the resulting solution over a period of 66 hours to evaporate hydrogen fluoride gas and precipitate crystalline particles of titanium-activated alpha zirconium phosphate. Scanning electron microscopy techniques revealed that the resulting phosphor particles had a platelet morphology. X-ray diffraction data indicated the formation of single-phase crystalline alpha zirconium phosphate having a layered atomic structure. The phosphor samples were evaluated for luminescence under cathode ray excitation and produced an ultraviolet-to-blue emission with a maximum peak at about 350 nm.

While there have been shown what are at present considered to be the preferred embodiments of the invention, it will be apparent to those skilled in the art that various changes and modifications can be made herein without departing from the scope of the invention as defined by the appended claims.

We claim:

1. A green-emitting titanium-activated fluorophlogopite phosphor having the general formula $KMg_3(Si_3Al)O_{10}F_2$:Ti.

2. A green-emitting titanium-activated fluorophlogopite phosphor according to claim 1 wherein said phosphor is activated by titanium in an amount of up to about 0.125 mole per mole of fluorophlogopite phosphor.

3. A green-emitting titanium-activated fluorophlogopite phosphor according to claim 1 wherein said phosphor is activated by titanium in an amount of 0.03 mole per mole of fluorophlogopite phosphor.

4. A red-emitting manganese-activated fluorophlogopite phosphor having the general formula $KMg_3(Si_3Al)O_{10}F_2$:Mn.

5. A red-emitting manganese-activated fluorophlogopite phosphor according to claim 4 wherein said phosphor is activated by manganese in an amount of up to about 0.10 mole per mole of fluorophlogopite phosphor.

6. A red-emitting manganese-activated fluorophlogopite phosphor according to claim 4 wherein said phosphor is activated by manganese in an amount of 0.04 mole per mole of fluorophlogopite phosphor.

7. A green-emitting terbium-activated fluorophlogopite phosphor having the general formula $KMg_3(Si_3Al)O_{10}F_2$:Tb.

8. A green-emitting terbium-activated fluorophlogopite phosphor according to claim 7 wherein said phosphor is activated by terbium in an amount of up to about 0.05 mole per mole of fluorophlogopite phosphor.

9. A green-emitting terbium-activated fluorophlogopite phosphor according to claim 7 wherein said phosphor is activated by terbium in an amount of 0.01 mole per mole of fluorophlogopite phosphor.

10. A blue-emitting titanium-activated crystalline alpha zirconium phosphate phosphor having the general formula $Zr_{1-x}Ti_x(HPO_4)_2 \cdot H_2O$.

11. A blue-emitting titanium-activated crystalline alpha zirconium phosphate phosphor according to claim 10 wherein x is from 0.02 to 0.08.

* * * * *